US006364759B2

(12) United States Patent
Allen et al.

(10) Patent No.: US 6,364,759 B2
(45) Date of Patent: *Apr. 2, 2002

(54) METHOD FOR PROCESSING AN ANIMAL CARCASS AND APPARATUS FOR PROVIDING ELECTRICAL STIMULATION

(75) Inventors: Deloran Matthew Allen, Derby, KS (US); Markus Festus Miller, Abernathy; Gretchen Gayle Hilton, Lubbock, both of TX (US); Howard G. Dolezal, Jr., Derby; Darren Grose, Wichita, both of KS (US)

(73) Assignees: Excel Corporation, Wichita, KS (US); Texas Tech University Office of Technology Transfer & IP, Laddock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/883,709

(22) Filed: Jun. 18, 2001

Related U.S. Application Data

(63) Continuation of application No. 09/562,614, filed on May 1, 2000, now Pat. No. 6,290,592.
(60) Provisional application No. 60/132,051, filed on Apr. 30, 1999.

(51) Int. Cl.⁷ .............................. A22C 9/00; A22B 3/00
(52) U.S. Cl. ........................................ 452/141; 450/58
(58) Field of Search ............................ 452/58, 57, 141

(56) References Cited

U.S. PATENT DOCUMENTS

| | | | |
|---|---|---|---|
| 2,544,681 A | * | 3/1951 | Harsham et al. ............... 452/58 |
| 2,544,724 A | * | 3/1951 | Rentschler ................... 452/58 |
| 2,621,362 A | * | 12/1952 | Cosden ........................ 452/58 |
| 2,879,539 A | | 3/1959 | Cervin |
| 3,314,103 A | | 4/1967 | Rains |
| 3,537,130 A | | 11/1970 | McDonnell |
| 3,626,550 A | | 12/1971 | Troy |
| 3,863,294 A | | 2/1975 | Barbee |
| 4,221,021 A | | 9/1980 | Swilley |
| 4,307,490 A | | 12/1981 | Watkins et al. |
| 4,340,993 A | | 7/1982 | Cook |
| 4,358,872 A | | 11/1982 | VanZandt |
| 4,495,676 A | | 1/1985 | Hartmetz, II |
| 4,561,149 A | | 12/1985 | Nijhuis |
| 4,675,947 A | | 6/1987 | Clatfelter et al. |
| 4,774,741 A | | 10/1988 | Bernhardt et al. |
| 4,860,403 A | | 8/1989 | Webb et al. |
| 5,007,336 A | | 4/1991 | Bernhardt et al. |

(List continued on next page.)

FOREIGN PATENT DOCUMENTS

DE 250046 A * 9/1987 .................. 452/58

OTHER PUBLICATIONS

Angwin, J., "How New Cattlemen Turn a Dead Cow Into a Tender Steak", *The Wall Street Journal*, vol. CV, No. 104, 1pg (May 25, 2000).

*Primary Examiner*—Charles T. Jordan
(74) *Attorney, Agent, or Firm*—Dorsey & Whitney LLP (57) ABSTRACT

Apparatus and method for processing animal carcasses are described. The method for processing the animal carcass includes electrically stimulating a target region of the animal carcass. By focusing or concentrating electrical stimulation on the middle muscle portion of an animal carcass, the middle muscle portion of the animal carcass can be tenderized without substantially interfering with the cooling rate of the muscles provided in the anterior and posterior portions. The apparatus includes an electrical stimulation frame that includes a plurality of electrical stimulation probes, an upper ground, and a lower ground, which are constructed and arranged for focusing or concentrating electrical stimulation on the middle muscles of an animal carcass.

25 Claims, 5 Drawing Sheets

U.S. PATENT DOCUMENTS

| | | |
|---|---|---|
| 5,282,940 A | 2/1994 | Griffis et al. |
| 5,486,145 A | 5/1995 | Dorsthorst et al. ........... 452/58 |
| 5,512,014 A * | 4/1996 | Burnett ........................ 452/58 |
| 5,704,830 A * | 1/1998 | Van Ochten ................. 452/58 |
| 5,879,732 A | 3/1999 | Caracciolo, Jr. et al. .... 426/231 |
| 5,888,132 A | 3/1999 | Burnett |
| 5,889,802 A | 5/1999 | Burnett |
| 6,001,655 A | 12/1999 | Spardaro et al. |
| 6,019,674 A | 2/2000 | Austin ......................... 452/59 |
| 6,159,090 A | 12/2000 | Thompson ................... 452/143 |
| 6,190,250 B1 | 2/2001 | Volk et al. ................... 452/177 |
| RE37,266 E | 7/2001 | Dorsthorst et al. ........... 452/58 |

* cited by examiner

METHOD FOR PROCESSING AN ANIMAL CARCASS AND APPARATUS FOR PROVIDING ELECTRICAL STIMULATION

CROSS-REFERENCE TO RELATED APPLICATIONS

This application is a continuation of U.S. Pat. application Ser. No. 09/562,614, filed on May 1, 2000, now U.S. Pat. No. 6,290,592, issued on Sep. 18, 2001, which claims priority to U.S. provisional patent application No. 60/132, 051, filed on Apr. 30, 1999. The entire disclosure of U.S. provisional patent application No. 60/132,051 is incorporated herein by reference.

FIELD OF THE INVENTION

The invention relates to a method for processing an animal carcass and an apparatus for providing electrical stimulation during the slaughter process. More particularly, the invention is directed to a method and apparatus for concentrating or focusing an electrical stimulation to a specific portion of an animal carcass.

BACKGROUND OF THE INVENTION

Electrical stimulation is one of a variety of methods, which have been used for at least the past twenty-five years to tenderize meat products. Electrical stimulation results in an acceleration of rigor mortis and a corresponding more rapid decrease of pH in the meat. Electrical stimulation influences the progress of post mortem biochemical processes in the muscle tissue of the slaughtered animal.

When an animal is alive, the muscle tissue operates under a condition that is called aerobic metabolism, which simply means that oxygen is available to the muscle tissue. When an animal dies, the muscle tissue goes into a state called anaerobic metabolism wherein oxygen is not available to the muscle tissue. Aerobic metabolism involves a process wherein the muscles utilize the sugar/glucose and burns it in order to create energy for use in relaxation and contraction of the muscles. The energy resulting from the sugar/glucose used by muscles in relaxation and contraction is further converted into water and carbon dioxide as long as the animal is breathing and oxygen is being received into the body. The water and carbon dioxide exits the body as waste. Under anaerobic metabolism conditions, the muscles utilize sugar/glucose to create energy for use in relaxation and contraction of muscles. Under anaerobic conditions, contractions occur by applying electrical stimulation to the carcass, and relaxation of muscles results from removal of the electrical stimulation. The energy used during muscle contraction and relaxation under anaerobic conditions is not further converted into water and carbon dioxide that exits the body as waste. That energy is shunted off as lactic acid, carrying a corresponding decline in muscle pH.

During anaerobic metabolism conditions, there is a gradual build up of lactic acid, resulting from the contraction and relaxation of muscles that causes the pH in the muscle to shift. Normal pH in living muscle tissue is about 7. As the typical onset of rigor mortis occurs and there is a build up of lactic acid, there is a shift in pH from about 7 down to about the 5.6 to 5.8 range. As long as there is sugar/glucose in the muscle tissue of the body that can be used as energy, the muscle will go through relaxation and contraction. When the sugar/glucose is depleted, the filaments present in the muscle tissue become fixed and rigid, thus the term "rigor mortis" refers to stiffening of the muscles after death.

Electrical stimulation of muscles accelerates the process of rigor mortis because electrical stimulation of the muscles causes severe contractions. The contractions in the muscles result in the muscles using up the sugar/glucose energy in the muscles faster. Accordingly, the muscle tissue goes into rigor mortis faster.

Prior art literature teaches that the effects of electrical stimulation works best on slaughtered animals when the nerve tracks of the animal still have the possibility to transfer stimulation. Some prior art methods teach that electrical stimulation has the best effect shortly after death. Other prior art methodologies, such as that disclosed in U.S. Pat. No. 4,561,149, teach that the electric current should be applied to the animal while it is still alive during at least part of the time period following complete stunning of the animal where there has been a complete lost of consciousness, and prior to the clinical death of the animal.

In the prior art methods of applying electrical stimulation to slaughtered animals, electrical stimulation can involve the use of direct current or alternating current, voltages that range between 20–3,600 volts, frequencies that range between 0–60 Hertz, and currents ranging between 0.1–6 amperes. Prior art literature indicates that the later after clinical death the application of electrical stimulation, the more current needs to be applied.

It is believed that the cooling of meat prior to the completion of rigor mortis causes the muscles of the slaughtered animal to contract. The contracting of the muscles causes the meat to be tough. In some cases, contracting or shortening of the muscle tissue may be up to as much as 50%. On the other hand, if the meat of the carcass is not cooled to at least a minimum level, around 65 degrees, prior to the completion of rigor mortis, other problems with the meat will result. One such problem is a condition called pale soft exudative (PSE), which causes the slaughtered meat to be pale in color, soft and watery. PSE results when the meat temperature is too high when the muscle enters rigor mortis. As the meat continues to cool and finally cools to the desired level, it will have a tendency to lose moisture content, be pale in color and be softer than normal.

Most generally, the prior art devices, which apply electrical stimulation to an animal carcass, apply the electrical charge through the entire carcass. An example of such a device and of the conventional method of applying an electrical stimulus to the entire animal carcass is disclosed in U.S. Pat. No. 2,544,861 to Harshan et al. It has been found that using an apparatus such as the disclosed U.S. Pat. No. 2,544,861 to Harshan et al. results in the denser thicker muscled sections of the carcass having PSE tendencies. This results when using an apparatus that applies an electrical stimulus to the entire animal carcass, such as the disclosed in U.S. Pat. No. 2,544,861 to Harshan et al., because the thick muscled sections of the carcass, such as the round and chuck muscles cannot be chilled at the same rate as the less dense loin and rib portions. The inability of the denser meat portions of the carcass to chill as rapidly as the less dense portions, in some instances, provides circumstances for rigor mortis to occur prior to sufficient chilling of the denser meat portions resulting in the denser chuck and round meat portions having the undesirable characteristics of being pale colored, soft and watery.

There is a need for an apparatus and method that allows for the use of electrical stimulation of an animal carcass to improve tenderness and to accelerate the completion of rigor mortis in the fabrication process of an animal carcass, wherein the apparatus and method take the varying densities of the meat portions into consideration.

SUMMARY OF THE INVENTION

Methods and apparatus for electrically stimulating animal carcasses are provided by the invention. The methods include electrically stimulating a target region or area of an animal carcass relative to other regions or areas of the animal carcass. In particular, the targeted region includes the midsection of an animal carcass which generally has thinner muscles compared with the posterior and anterior ends of an animal carcass. Preferred animal carcasses that can be processed according to the invention include bovine carcasses, such as, bull, heifer, cow, and steer carcasses. Additional animal carcasses that can be processed according to the invention include porcine, ovine, and poultry carcasses.

It is generally desirable to cool the internal muscle temperature of an animal carcass prior to the onset of rigor. The applicants have found that electrical stimulation generates heat within the muscle tissue being electrically stimulated. In order to allow the thicker muscles provided in the posterior and anterior regions of an animal carcass to cool prior to the onset of rigor, the applicants have developed a technique for focusing or concentrating electrical stimulation within the midsection of an animal carcass, and, in general, isolating the posterior and anterior regions of the animal carcass from electrical stimulation. Because the regions of the animal carcass (anterior, midsection, and posterior) are not split apart during the step of electrical stimulation, it is expected that the posterior and the anterior regions will receive some level of electrical stimulation but substantially less electrical stimulation than the midsection of the animal carcass.

The electrical stimulation apparatus includes an electrical stimulation frame having an inlet, an outlet, and a length extending between the inlet and the outlet. The frame is constructed for allowing an animal carcass to pass from the inlet to the outlet and for providing targeted electrical stimulation to the animal carcass as it passes from the inlet to the outlet. The electrical stimulation frame includes a plurality of electrical stimulation probes, an upper ground, and a lower ground. The plurality of electrical stimulation probes is provided along the length of the frame for contacting the animal carcass as it passes between the inlet and the outlet. The upper ground is provided extending along the length of the frame above the plurality of electrical stimulation probes and is provided for contacting the animal carcass. The lower ground is provided extending along the length of the frame and below the plurality of electrical stimulation probes and is provided for contacting the animal carcass. In general, it is desirable for the upper ground and the lower ground to contact the animal carcass while the animal carcass is being electrically stimulated by at least one of the plurality of electrical stimulation probes. If the animal carcass is not grounded to either or both of the upper ground and the lower ground, it is expected that the animal carcass will ground through the trolley conveying the animal carcass. It is desirable to ground the animal carcass through both the upper ground or the lower ground to maintain a focus or concentration of current through the muscles provided in the midsection of the animal carcass and to minimize electrical stimulation of the muscles provided in the anterior and posterior regions of the carcass.

A method for electrically stimulating an animal carcass is provided by moving an animal carcass along a length of the electrical stimulation frame from the inlet to the outlet, and electrically stimulating the animal carcass. Preferably, the animal carcass is moved along the electrical stimulation frame dorsal side first in order to maximize the contact of the surface of the animal carcass with the plurality of electrical stimulation probes.

BRIEF DESCRIPTION OF THE DRAWINGS

The present invention will become apparent upon consideration of the following detailed description of an embodiment thereof, especially when taken in conjunction with the accompanying drawings, wherein.

DETAILED DESCRIPTION OF THE INVENTION

A method for processing an animal carcass is provided by the invention. An animal carcass generally refers to the body of an animal after it has been stunned and rendered unconscious. The processing of an animal carcass is generally an assembly line type operation where several carcass are moved and processed along a series of stations. While the following includes a discussion of the processing of a single animal carcass, it should be understood that the processing of an animal carcass, according to the present invention, can be applied to a continuous assembly line operation of processing numerous animal carcasses.

The slaughter operation generally includes the operations of stunning, bleeding, hide removal and evisceration of the animal and subsequently cooling the animal carcass to a desired temperature. Typically, a desired internal muscle temperature is about 40° F. or less. Slaughter plants often have chill capabilities of 24 hours or 48 hours. Those plants with 24 hour capacity must chill rapidly while plants with 48 hour capacity can chill more slowly. The general objective in cooling the animal carcass is to reduce the internal muscle temperatures of the animal carcass to below about 70° F. prior to the onset of rigor. The internal muscle temperature refers to the temperature deep within a particular muscle. Ideally, the internal muscle temperature should be reduced to the middle 60s° F. prior to the onset of rigor. If temperatures are above this range when rigor mortis completion occurs, PSE muscle may result. The onset of rigor is characterized by stiffening of the muscles after death. The steps of processing the animal carcass, after it has been cooled to a desired temperature, are generally referred to as the fabrication process.

Certain muscles on the animal carcass are thicker than other muscles. It can be difficult to sufficiently cool the thick muscles so they reach an internal muscle temperature of below about 70° C. prior to the onset of rigor. This is particularly true if the thick muscles have been electrically stimulated and rigor consequently accelerated. The invention provides for the electrical stimulation of the thinner muscles provided along the midsection of the animal carcass, without substantially electrically stimulating the end sections of the animal carcass. It should be appreciated that the reference to not substantially electrically stimulating the end sections of the animal carcass indicates that the end sections are not targeted for electrical stimulation. Rather, the midsection is targeted for electrical stimulation, and the end section may receive, in view of their proximity to the midsection, a minor amount of electrical stimulation. Accordingly, electrical stimulation is concentrated or focused in the midsection of the animal carcass, and the amount or extent of electrical stimulation in the end sections is expected to be significantly less than provided in the midsection. It should be appreciated that the reference to isolating electrical stimulation from the end sections is not meant to require a complete absence of any electrical stimulation in the end sections, but rather reflect the understanding that the electrical stimulation is to be focused or concentrated in the midsection rather than in the end sections.

Various animal carcasses can be processed according to the invention. Preferred animal carcasses include bovine carcasses and more particularly, cow or steer carcasses. In a cow or steer carcass, the midsection generally refers to the region which includes the rib section and the loin. The anterior portion of the animal carcass, includes the shoulder muscles which industry refers to as the chuck. The posterior end of the animal carcass includes the hind limb muscles which industry refers to as the round. More technically, the midsection includes thinner muscles of the rib and loin that are generally characterized as extending from about between the fifth and sixth thoracic vertebrae and about between the fourth and fifth sacral vertebrae. By focusing the electrical stimulation on the rib and loin midsection, the electrical current generally remains isolated from the chuck and round muscles. Accordingly, by electrically stimulating the middle muscles, it is expected that the tenderness of the middle muscle can be enhanced and the quality of the middle muscle can be enhanced as perceived by the consumer.

Referring in detail now to the drawings, wherein an embodiment of the invented method and apparatus for electrically stimulating an isolated area of a livestock carcass is shown. The livestock carcass 10 is a bovine carcass. The apparatus, shown in FIGS. 1 and 2, referred to as 100 in FIG. 1, which provides for the electrical stimulation of an isolated section of the carcass 132, includes a housing 101, an electrical stimulation stake 118 and a pair of ground stakes 114 and 116. The electrical stimulation stake 118 is electrically connected to the housing by wire 120. The ground stakes 114 and 116 are electrically connected to the housing 101 by wires 122 and 124. The housing 101 further includes first and second push activated safety interlock buttons 102 and 104, an electrical stimulation duration indication light 106, a pulse indication light, a voltmeter 110 and an ammeter 112.

Figure 1:
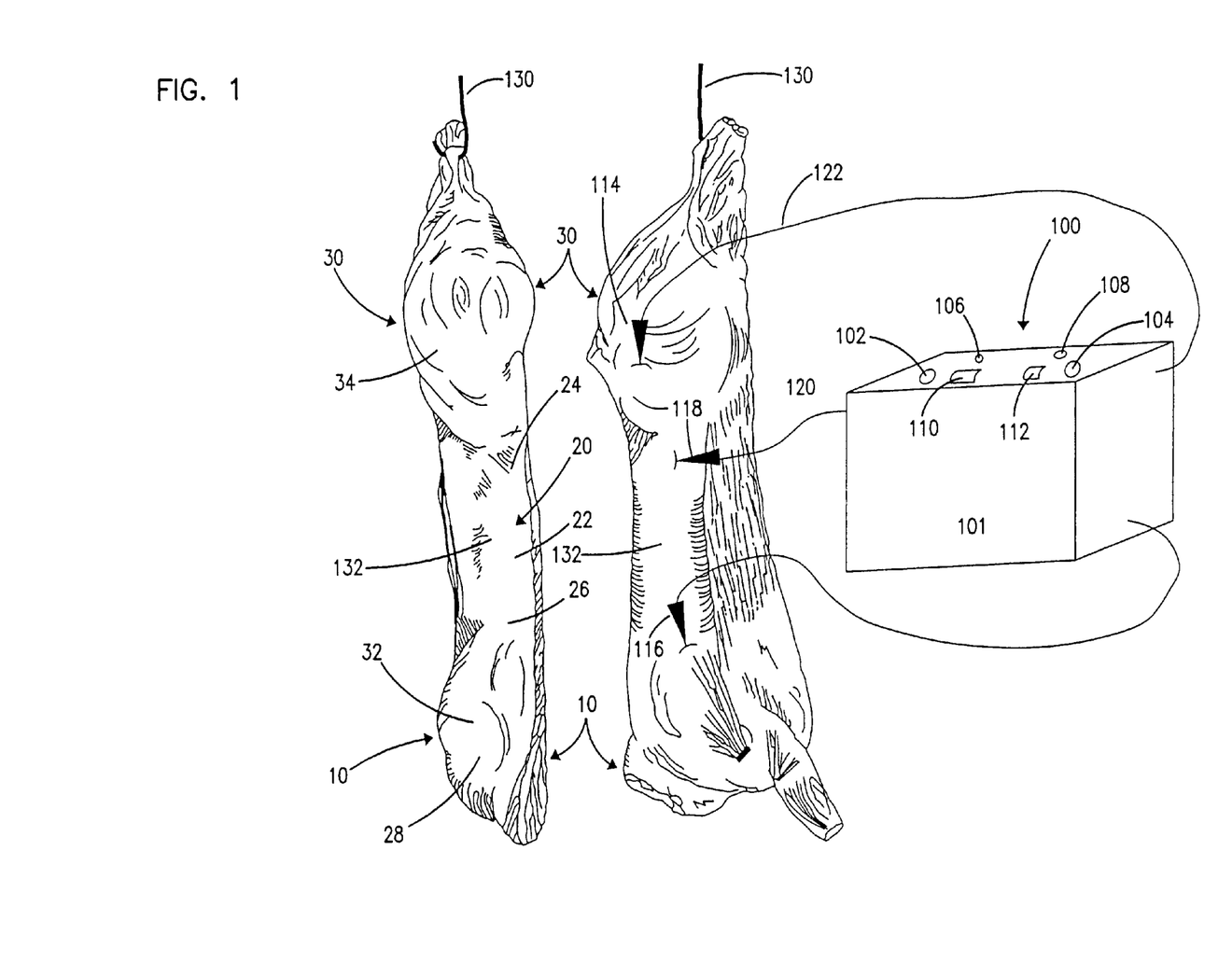
FIG. 1 is a diagrammatic view of a beef carcass being stimulated by the apparatus of the present invention.

The apparatus 100 performs the method of electrically stimulating an isolated area of a livestock carcass by inserting the electrical stimulation stake 118 and the pair of ground stakes 114 and 116 into the carcass 10 in the manner shown. The animal carcass 10 has a midsection 20 including relatively thin muscles 22. Exemplary thin muscles in the midsection 20 include the loin 24 and the rib muscle 26. The animal carcass 10 additionally includes an anterior end 28 and a posterior end 30. The anterior end 28 includes chuck muscle 32, and the posterior end 30 include round muscle 34. In many bovine carcasses, the chuck and round muscles are as much as twice as thick as the loin and rib muscles. Accordingly, reducing the internal muscle temperature of the chuck and round muscles is often a much slower process compared with reducing the internal muscle temperature of the loin and rib muscles. Attaching the electrical stimulation stake 118 and the pair of ground stakes 114 and 116 into the carcass 10 as shown generally results in the substantial isolation of the round and chuck muscles of the carcass from electrical stimulation during operation of the apparatus 100.

More specifically, the first ground stake 114 is preferably inserted into the carcass in the vicinity of the fourth or fifth sacral vertebrae. The first ground stake 114 is inserted into this area of the carcass because this area is the separation point of the carcass loin and round sections. The second ground stake 116 is preferably inserted into the carcass in the vicinity of the fifth and sixth thoracic vertebrae. The second ground stake 116 is inserted into this area of the carcass because this area is the separation point of the carcass rib and chuck. The electrical stimulation stake 118 is preferably inserted into the carcass in the vicinity of the fourth and fifth lumbar vertebrae. The electrical stimulation stake 118 is preferably inserted into this area of the carcass because this area is the separation point of the top loin and sirloin portions of the loin.

During operation of the apparatus 100 that performs the method of electrically stimulating an isolated area of the livestock carcass 10, current flows from the electrical stimulation stake 118 through the loin section of the carcass to first ground stake 114 and flows from the electrical stimulation stake 118 through the loin section of the carcass to second ground stake 116. Current flow through the loin section of the carcass causes the muscles in the carcass to go through relaxation and contraction, thereby causing an acceleration of the rigor mortis and faster decrease of pH in the carcass meat. Substantial isolation of current flow through the loin section of the carcass provides for faster rigor mortis in the loin section. Any electrical stimulation applied to the round and chuck areas of the carcass 10 is marginal.

Figure 2:
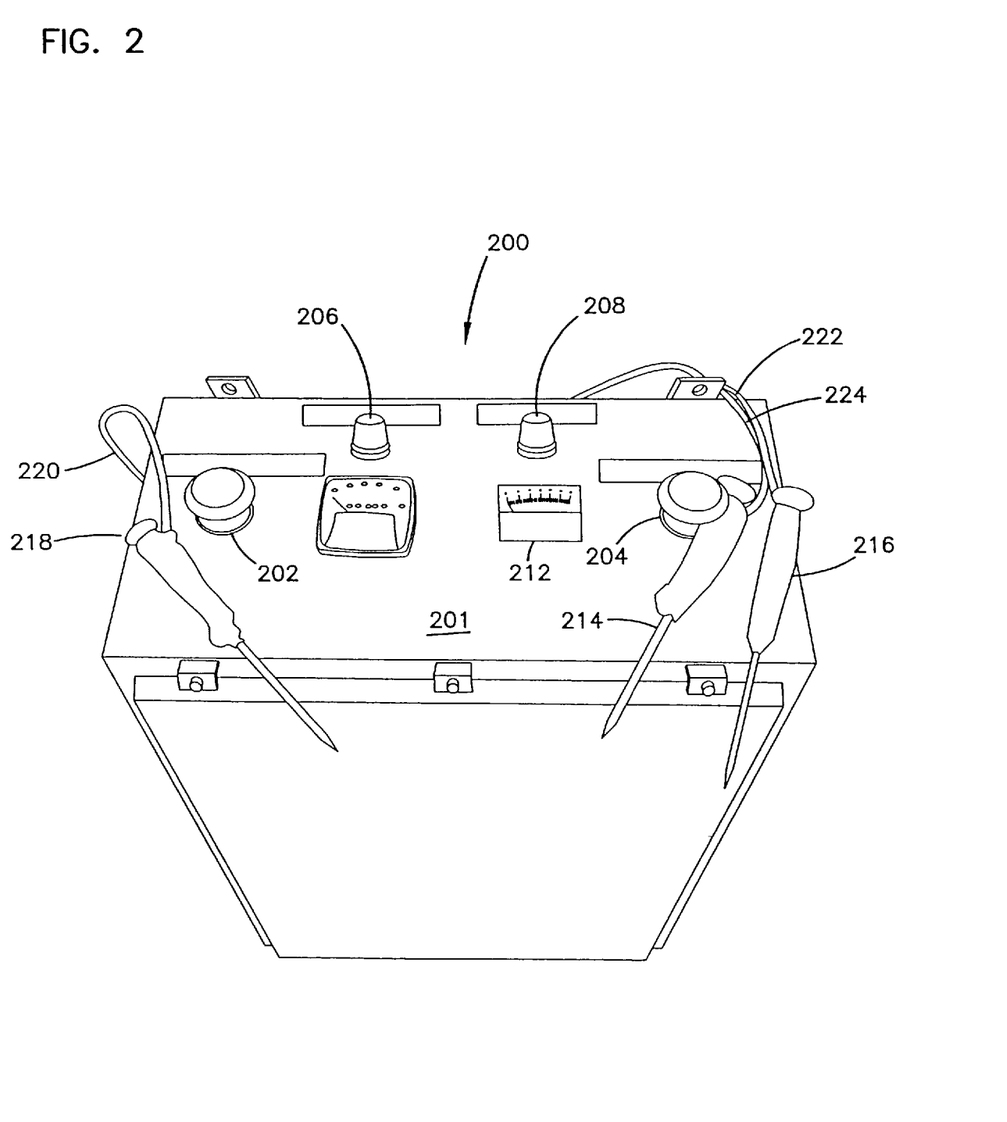
FIG. 2 is a perspective view of the electrical stimulation apparatus.

Referring to FIG. 2, the apparatus 200 that provides for the electrical stimulation of an isolated section of an animal carcass is shown. Generally, the apparatus includes a housing 201, and three stimulation stakes 214, 216 and 218, which provide for the substantial isolation of electric current flowing through a defined area of the carcass. The defined area of current flow through the carcass is outlined generally by the positioning of the stimulation stakes 214, 216 and 218 in a manner substantially similar to insertion of stimulation stakes 114, 116, and 118 into the animal carcass 10 as illustrated in FIG. 1. Stimulation stake 218 is electrically connected to the housing 201 by a wire 220. Stimulation stake 218 is sometimes referred to as the hot stimulation stake because it is the stimulation stake with the high electrical potential relative to ground. Stimulation stakes 214 and 216 are referred to as the ground stakes because these stimulation stakes which are electrically connected to the apparatus housing 201 by wires 222 and 224 and have zero potential. The housing 201 further includes 2 push-activated safety interlock buttons 202 and 204 which both need to be engaged or pressed in order to begin the cycle of electrical stimulation. The dual push activity safety interlock buttons 202 and 204 are necessary in order to provide safety to an operator of the apparatus so that the operator has less of a chance to inadvertently touch the carcass with a free hand during the electrical stimulation portion of the fabrication process. In addition, the housing includes a volt meter 210 and an amp meter 212. A voltmeter 210 and amp meter 212 are installed on the apparatus in order to provide user feedback during parameter variation. The apparatus 200 provides for the variation of current and voltage potential on the hot stimulation stake 218.

More specifically, the present embodiment of the apparatus for applying electrical stimulation to an isolated section of a carcass has a variable voltage output of 0–600 volts. The voltmeter 210 illustrates the voltage applied through the hot stake 218. The voltage and current applied to the hot stake 218 are variable in the present embodiment because of the relationship voltage equals current multiplied by the resistance (V=R*I). For example, in the illustration shown in FIG. 1, wherein the apparatus for applying electrical stimulation to an isolated section of a carcass is utilized on a beef carcass, because the resistance on a beef carcass is approximately 90 ohms, in order to achieve different levels and types of electrical stimulation, the voltage and current must be varied. Modifications may include adjusting the shock duration, and pulse intervals of the electrical stimulation being applied. The stimulation stakes 114, 116 and 118 are comprised of sharpened aluminum stakes with handles 230, 232 and 234. The handles 230, 232 and 234 are not electrically isolated. The dual push-activated safety interlock button system requiring an operator to use both hands to press the interlock buttons before the system can only be activated provides safety from human touch. Accordingly, the operator will not be able to handle the stimulation stakes 214, 216 and 218 when the power is applied to the apparatus 200.

Figure 3:
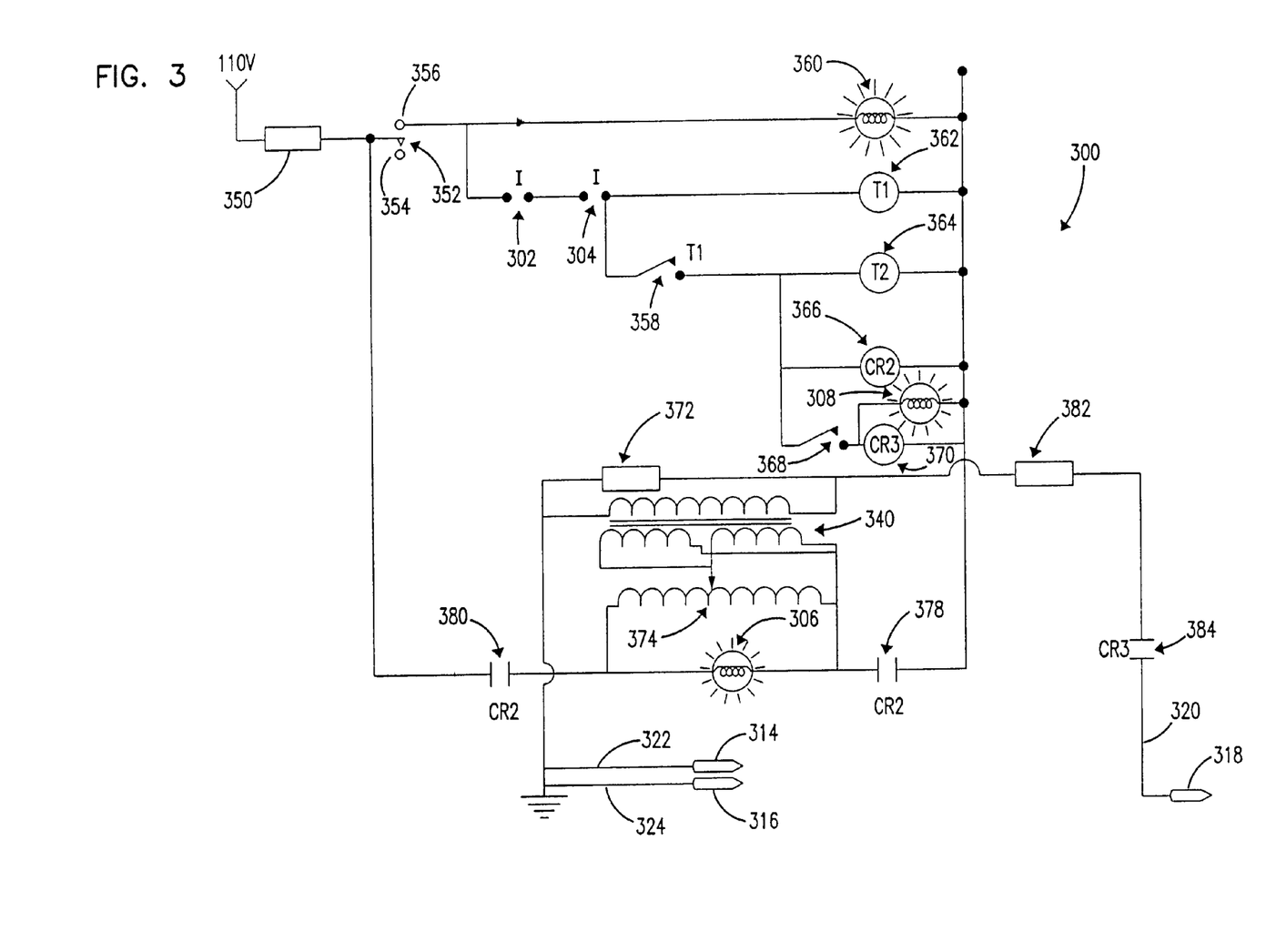
FIG. 3 is a schematic view of the circuitry employed in the electrical stimulation apparatus.

The circuit housed in apparatus 200 is illustrated in FIG. 3. This control unit has a main power on switch 352 which may be moved between off 354 and on 356 positions whenever it is desired to operate the apparatus for electrically stimulating an isolated area of a livestock carcass. Movement of the main power on switch 352 from the off position 354 to the on position 356 supplies 110 volts to the circuit 300. The 110 volts is directed through a 30-amp circuit breaker that allows for disabling of current through the circuit 300 when current exceeds 30 amps. Once the on/off switch 352 is turned to the on position 356, the circuit recognizes that voltage is being applied at node 356 through the power on indication lamp 360. In order for power to be applied to the remainder of the circuit, both buttons 302 and 304 of the dual button push activated safety interlock switch must be engaged. The dual button push activated safety interlock switch provides a safety mechanism so that the system operator has to have both hands on the apparatus in order for power to be applied to the circuit. If the operator were to disengage either of the two buttons 302 and 304 of the dual button push activated safety interlock switch, the 110 volts would be isolated from the remainder of the circuit 300, disengaging the apparatus for electrically stimulating an isolated area of a livestock carcass. Upon pressing both push activated safety interlock buttons 302 and 304, a closed circuit occurs and power is applied to switch timer T1, 362. When power is applied to switch timer T1, 362, the switch portion closes 358 and the timer begins to count through its timing sequence. Switch timer T1 is a variable timer. Accordingly, it is to be understood that the timing sequence that switch timer T1 controls is variable and can be set a length desired by the system user. For example, if switch timer T1 362 has a timing sequence of one minute, the switch portion of switch timer T1 358 will remain closed for one minute, unless the operator disengages one or both of the buttons 302 and 304 of the dual button push activated safety interlock switch. If either or both buttons 302 and 304 are disengaged, timer T1 362 will automatically reset and the time duration cycle begins again. Assuming the operator maintains engagement of both buttons 302 and 304 of the dual button push activated safety interlock switch, the switch portion 358 of timer T1 remains closed for the time duration set and automatically opens after the preset time duration of timer T1 cycles through. The automatic opening of the switch portion 358 of timer T1 eliminates the need for the operator to time the application of electrical stimulation to the carcass. The electrical stimulation application time duration is automatic. The operator is notified that electrical stimulation is complete because the electrical stimulation duration light 306 would no longer be illuminated.

During the timing sequence, when the switch portion of switch timer T1 has a closed circuit 358, power is applied to switch timer T2 364, 368. Switch timer T2 364 is a pulse timer that controls the pulsing function of the electrical stimulation being applied through activation of control relay CR3 384. Switch Timer T1 also activates control relay C2 366 that controls application of voltage to the transformer 340. Control relay C2 366, 378, 380 is a power activated switch which closes circuit connections 370 and 380 when switch timer T1 358 allows voltage to be applied to control relay C2, 366. Upon the activation of the switches 378 and 380 of control relay C2, the transformer 340 may be energized.

Energizing control relay C2 applies voltage to the stimulation duration lamp 306 and the variac 374 that are electrically connected to the transformer 340. The variac 374 provides a means for control of the output voltage applied to the transformer 340 to be stepped up. In the present embodiment, the variac 374 can apply a variation of voltages, from 0–120 volts AC, to the transformer 340. That variable voltage is applied to the step-up transformer 340 wherein the voltage may be stepped up from 120 to 600 volts AC if the variac is applying 120 volts to the transformer. The voltmeter 372 measures the voltage output by the step up transformer 340 and provides the system operator with a visual indication of the voltage being applied to the carcass.

Circuit 300 also illustrates that electrical stimulation stake 318 and the ground stakes 314 and 316. The ground stakes 314 and 316 are electrically connected to ground. The electrical stimulation stake 318 is electrically connected to the circuit 300 through control relay C3, 370. Control relay C3, 370 is energized upon activation of pulse timer T2, 364 causing the switch portion of switch timer T2, 368 to close. The timing on switch timer T2, 364, while variable, in the preferred embodiment it is approximately 2 seconds. Accordingly, the switch 368 portion of pulse timer T2 cycles through open and close positions every 2 seconds during the timing sequence of switch timer T1, 362. When switch timer T1 362 completes its timing sequence, the switch portion 358 of timer T1 opens, disabling energization of the variac 374 and transformer 340 portions of the circuit. When timer T2 368 closes, the switch portion 368 in this embodiment for two seconds, control relay CR3, 370, is energized and the switch portion of control relay CR3, 384 is closed and the voltage from the transformer 340 is applied to the electrical stimulation hot stake 318 through the electrical connection 320. The ammeter 382, also displays the current applied to the electrical stimulation stake 318 so that the operator can monitor the current being applied to the carcass. It is to be understood that the timing sequences in timers T1 and T2 are variable.

Figure 4:
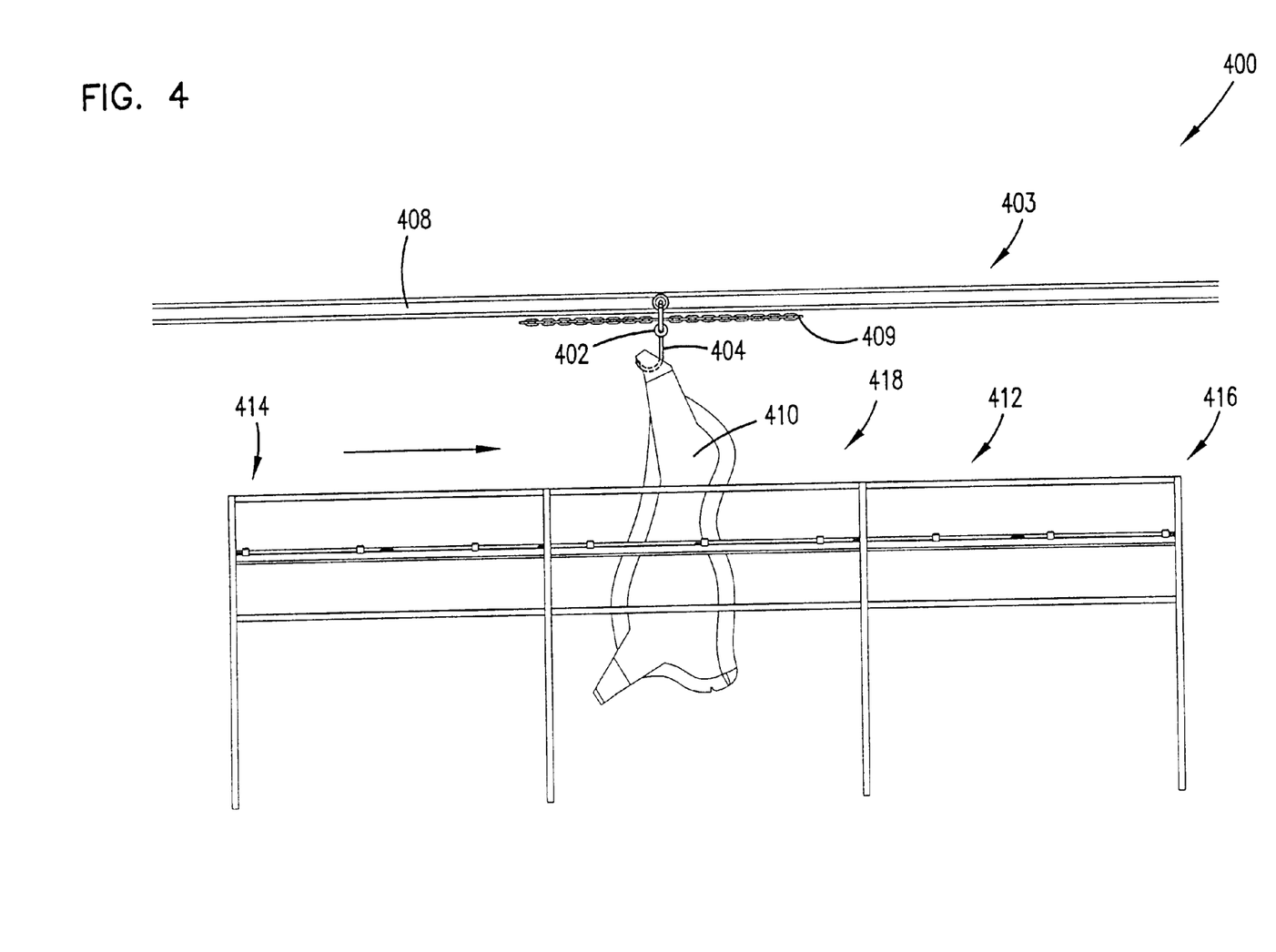
FIG. 4 is a side view of an alternative embodiment of an electrical stimulation apparatus according to the principles of the present invention.
Figure 5:
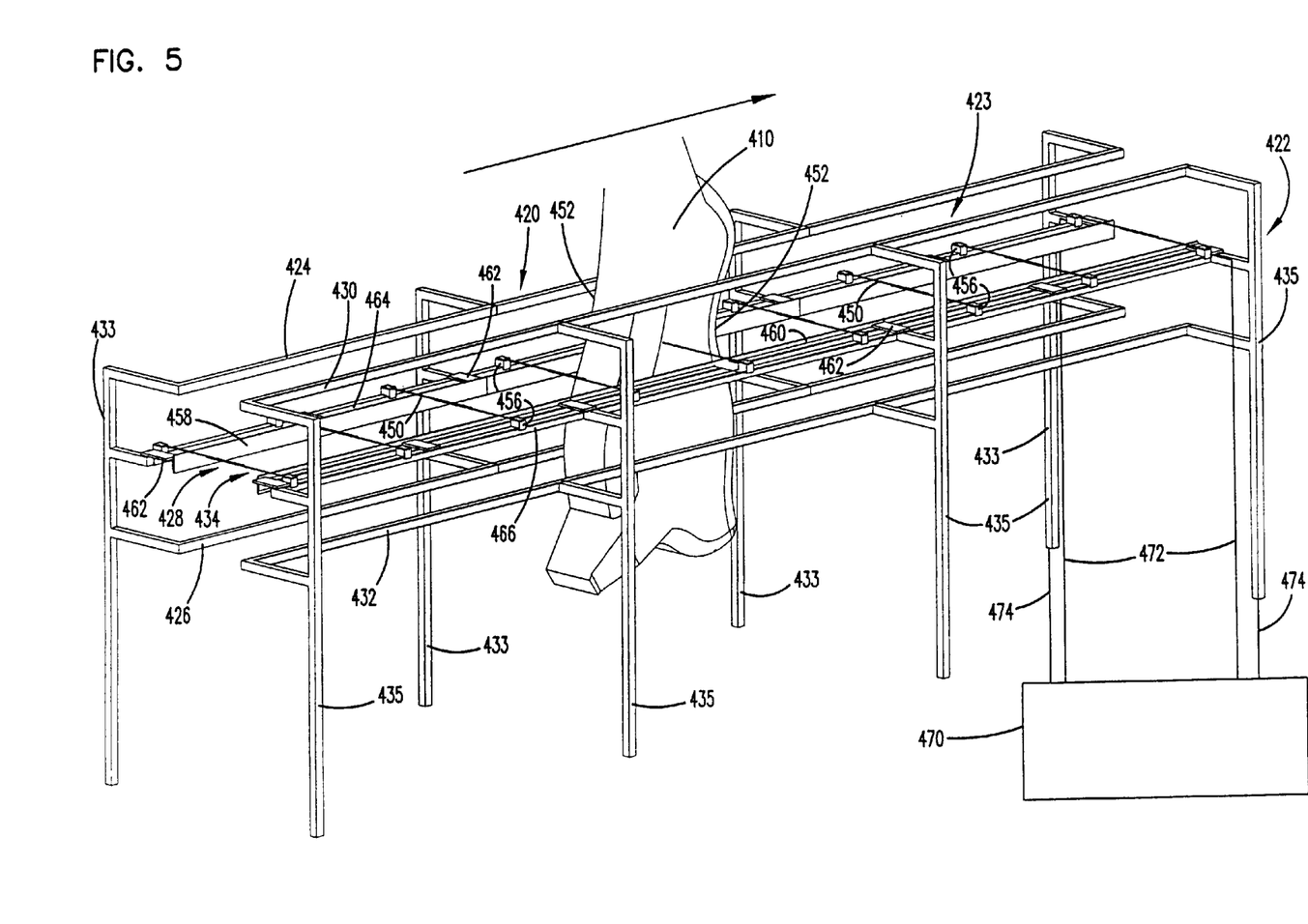
FIG. 5 is a perspective view of the electrical stimulation apparatus of FIG. 4.

Now referring to FIGS. 4 and 5, an alternative embodiment of an electrical stimulation apparatus according to the present invention is shown at reference numeral 400. The electrical stimulation apparatus 400 is particularly adapted for application to a continuous assembly line operation for processing animal carcasses.

Animal carcasses, such as, bovine carcasses, are commonly split to provide a left side and a right side. The split is usually provided along the backbone. According to the invention, the reference to "animal carcass" is meant to describe whole carcasses, half carcasses, and any other subdivision of an animal carcass. As described in more detail below, an animal carcass which can be processed according to the invention is either a left side carcass or a right side carcass, wherein the whole animal carcass has been split down its backbone to create the left side carcass and the right side carcass. Additional carcasses that can be processed according to the invention include porcine carcasses, ovine carcasses, and poultry carcasses.

During processing, the animal carcass sides can be hung from the posterior portion of the side from a hanger 402. The hanger 402 can be considered part of a conveyor 403 that conveys an animal carcass (either whole or side) through animal processing operations. The hanger 402 can be provided in the form of a hook 404. The hanger 402 extends from a trolley 406 that runs along a rail 408. The trolley 406 can be pulled along the rail 408 by a chain 409.

The electrical stimulation apparatus 400 can be used to provide targeted electrical stimulation to an animal carcass. The animal carcass 410 is shown as a right side carcass and moves through the electrical stimulation frame 412 in the direction of the arrow. Moving in the direction shown, the animal carcass 410 enters the electrical stimulation frame 412 at the inlet 414 and exits at the outlet 416. The electrical stimulation apparatus 400 can be constructed so that as the animal carcass 410 moves through the length 418 of the electrical stimulation frame 412 between the inlet 414 and the outlet 416, it receives the desired electrical stimulation protocol.

The electrical stimulation frame 412 includes a left side frame 420 and a right side frame 422. It should be appreciated that the electrical stimulation frame 412 can be provided with either the left side frame 420 or the right side frame 422. It is a matter of convenience to provide both the left side frame 420 and the right side frame 422 in order to accommodate convenient processing of either side of an animal carcass. The animal carcass 410 moves from the inlet 414 to the outlet 416 along an animal carcass traveling path 423 provided between the left side frame 420 and the right side frame 422.

The left side frame 420 includes an upper ground 424, a lower ground 426, and a plurality of electrical stimulation probes 428 provided between the upper ground 424 and the lower ground 426. Similarly, the right side frame 422 includes an upper ground 430, a lower ground 432, and a plurality of electrical stimulation probes 434 provided between the upper ground 430 and the lower ground 432. It should be appreciated that the reference to "upper" and "lower" refers to the respective location of the ground relative to the electrical stimulation probes. That is, as the animal carcass is suspended from a hanger 402, the upper grounds 424 and 430 are provided closer to the hanger 402 than the plurality of electrical stimulation probes 428 and 434, and the lower grounds 426 and 432. Furthermore, although the upper ground 424 and the lower ground 426 are shown provided within a vertically extending plane, this condition is not necessary. That is, the upper ground 424 and the lower ground 426 are provided so that they contact the animal carcass 410 as it moves along the animal carcass traveling path 423. In order to maintain contact between the upper ground and the carcass or between the lower ground and the carcass, it may be appropriate to extend either or both of the upper ground or the lower ground further into the animal carcass traveling path. The upper grounds 424 and 430, lower grounds 426 and 432, and plurality of electrical stimulation probes 428 and 434 are supported by left and right frame constructions 433 and 435.

In a typical animal processing facility, an animal carcass is suspended from its posterior end so that its anterior end is closer to the ground. Accordingly, the position of each of the upper grounds 424 and 430, the lower grounds 426 and 432, and the plurality of electrical stimulation probes 428 and 434 can be arranged based upon the expected position of the muscle of an animal carcass passing along the animal carcass traveling path 423. For example, it is desirable for the electrical stimulation probes 428 and 434 to be placed so that they contact the animal carcass surface about centrally to the muscles targeted for electrical stimulation. In addition, it is generally desirable for the upper grounds 424 and 430 to contact the surface of the animal carcass at a location which allows for electrical stimulation in the midsection but minimizes electrical stimulation within the muscles in the posterior region. In general, this location can correspond to a location at about the border between the midsection and the posterior end section of the animal carcass. Similarly, it is generally desirable for the lower grounds 426 and 432 to contact the animal carcass surface at a location that allows for electrical stimulation in the midsection but minimizes electrical stimulation within the muscles in the anterior region. In general, this location can correspond to a location at about the junction between the midsection and the anterior region of an animal carcass. In a preferred embodiment, the electrical stimulation probes contact the surface of the animal carcass at a location corresponding to the region of the fourth and fifth sacral vertebrae, the upper grounds 424 and 430 contact the surface of the animal carcass at a location corresponding to between about the eleventh thoracic vertebrae and the second lumbar vertebrae, and the lower grounds 426 and 432 contact the surface of the animal carcass at a location corresponding to about the fifth thoracic vertebrae and the sixth thoracic vertebra. In the situation where bovine carcasses are being processed, the vertical distance between the plurality of electrical stimulation probes and the upper ground is between about one foot and about two feet, and the distance between the plurality of electrical stimulation probes and the lower ground is between about one foot and about two feet. Preferably, the distance between the electrical stimulation probes and the upper ground and the lower is about one and one-half feet.

It should be appreciated that the electrical stimulation probes according to the invention are used in combination with the ground to generate an electric current in targeted muscles. Accordingly, the electrical stimulation probes include a surface that contacts the animal carcass. In the case of electrical stimulation probes that are stakes, the stakes are embedded into the carcass (preferably muscle). Preferably, the electrical stimulation probes provide surface contact with the surface of the carcass, and are not inserted into the muscle of the carcass.

When the electrical stimulation frame 412 includes both a left side frame 420 and a right side frame 422, it is desirable to provide a space 440 between the frames which is sized to receive the animal carcass 410 while allowing the upper grounds 424 and 430 and the lower grounds 426 and 432 to contact the animal carcass 410. When processing bovine carcasses, it is preferable to provide a distance between the upper grounds 424 and 430 of between about one foot and about five feet, and a distance between the lower grounds 426 and 432 of between about one foot and about five feet. Preferably, the distance between the upper grounds and the distance between the lower grounds is between about one and one-quarter feet and about two feet.

The plurality of electrical stimulation probes 428 and 434 are provided extending away from the left side frame 420 and the right side frame 422, respectively. That is, the plurality of electrical stimulation probes 428 and 434 extend into the animal carcass traveling path 423. Accordingly, as the animal carcass 410 moves through the animal carcass traveling path 423, the animal carcass 410 contacts each of the plurality of electrical stimulation probes 428 and 434. The contact between the animal carcass 410 and each of the electrical stimulation probes is for a period of time which varies depending upon the speed of the animal carcass 410 along the animal carcass traveling path 423, the length of each electrical stimulation probe, and the size of the animal carcass.

The plurality of electrical stimulation probes 428 includes electrical stimulation bars 450 which extend into the animal carcass traveling path 423. Preferably, the electrical stimulation bars 450 generally extend at an angle of between about 50 degrees and about 130 degrees from an axis extending along the animal carcass traveling path 423 that is expected to be along the length of the electrical stimulation frame 412. Preferably, the electrical stimulation bars 450 are provided perpendicular to the line of travel through the animal carcass traveling path 423. The electrical stimulation bars 450 are preferably provided so they bend allowing the animal carcass 410 to move through the animal carcass traveling path 423. As the animal carcass 410 moves along the animal carcass traveling path 442, each electrical stimulation bar or rod 450 sequentially contacts the exterior surface 452 of the animal carcass and maintains contact with the exterior surface 452 until the animal carcass 410 moves beyond the contact length 454 of the electrical stimulation probes 450. Rather than provide electrical stimulation bars 450 which bend, the electrical stimulation bars 450 can be provided on a spring which allows the electrical stimulation bars 450 to remain relatively rigid while moving out of the way of the animal carcass and maintaining contact with the animal carcass surface 452.

The electrical stimulation frame 412 includes a left side frame 420 and a right side frame 422 to conveniently process both left and right sides of carcasses. In general, it is desirable to maximize the contact area between each electrical stimulation probe and the animal carcass. Depending upon whether the animal carcass moving along the animal carcass traveling path 423 is a left side or a right side, either the electrical stimulation probes 428 or the electrical stimulation probes 434 will maintain better contact. The plurality of electrical stimulation probes 428 maintains better electrical contact with the animal carcass 410 when the carcass is a left side carcass (dorsal side first). The plurality of electrical stimulation probes 434 maintains better electrical contact with the animal carcass when the carcass is a right side carcass (dorsal side first).

The animal carcass 410 is preferably moved through the electrical stimulation frame 412 dorsal side first from the inlet 414 to the outlet 416. The applicants have found that by moving the animal carcass 410 dorsal side first, it is possible to provide better contact between the plurality of electrical stimulation probes 428 and 434 and the animal carcass surface 452 closest to the muscles targeted for electrical stimulation.

The electrical stimulation probes 428 and 434 are held in place on the electrical stimulation frame 412 by receivers 456. The receivers 456 insulate the electrical stimulation probes 428 and 434 from the upper grounds 424 and 430 and the lower grounds 426 and 432. Furthermore, the electrical stimulation frame 412 includes insulating rails 458 and 460 that are held in place by rail holders 462. In general, it is desirable to avoid short circuiting the operation of the electrical stimulation frame 412 by contact of the animal carcass with any other grounding part of the frame than the upper grounds 424 and 430 and the lower grounds 426 and 434. Accordingly, the insulating rails 458 and 460 are provided so that the animal carcass does not create a short circuit between the electrical stimulation probes 428 and 434 and the bars 464 and 466 along which the electrical stimulation probe holders 456 are placed.

A power source 470 is provided for providing electrical stimulation to the electrical stimulation probes 428 and 434 along line 472, and to the ground along line 474.

The plurality of electrical stimulation probes 428 and 434 are preferably constructed to provide periods of electrical stimulation and periods of no electrical stimulation as the animal carcass 410 moves through the electrical stimulation frame 412. The applicants have found that it is desirable to include rest intervals where there are no electrical stimulations so that the targeted muscles can relax between periods of electrical stimulation. In general, it is desirable for the rest interval to be sufficient so that the animal carcass regains at least about 90% of its original length. During the electrical stimulation, the animal carcass can shorten in its original length by almost 40%. Much of this shortening is the result of the muscles contracting and the vertebrae curving. The applicants believe that the following formulae represent the desired relationship between the voltage for electrical stimulation, the time of electrical stimulation, and the time of interval between electrical stimulations:

$$T_{stim} = 60 \times D_{cl}/V_{cs}$$

$$T_{rest} = 60 \times (D_{ww} - D_{cl})/V_{cs}$$

In the above formulae, $T_{stim}$ refers to time of stimulation, $T_{rest}$ refers to time of rest between stimulations, $V_{cs}$ refers to chain speed conveying the carcass through the stimulation frame, $D_{ww}$ refers to the contact point spacing (distance between electrical stimulation probes), and $D_{cl}$ refers to contact length (distance in which the electrical stimulation probe is in contact with the carcass). For a $V_{cs}$ of 42 feet/min., a $D_{ww}$ of three feet, and a $D_{cl}$ of two feet, the $T_{stim}$ is about 2.9 seconds and the $T_{rest}$ is about 1.4 seconds.

It is generally desirable to provide an electrical stimulation protocol that provides the desired level of stimulation in the targeted muscles of an animal carcass while minimizing floor space dedicated to providing electrical stimulation in an animal processing facility. In general, it is desirable to implement the electrical stimulation protocol until, under observation, it appears that the reaction by the animal carcass to the electrical stimulation is significantly decreased or that the animal carcass does not react any further to the electrical stimulation. It is believed that the electrical stimulation causes a contraction in the muscles that corresponds to a working of the muscles. It is believed that as the energy in the muscle is depleted by the working of the muscle, the muscle reaches a further electrical stimulation will not generate a substantially observable amount of contraction.

The electrical stimulation protocol can be maintained for at least about thirty seconds in order to deplete the targeted muscles. Preferably, the electrical stimulation protocol is conducted by multiple periods of electrical stimulation. The electrical stimulation protocol can be provided with either alternating current or direct current. Preferably, the electrical stimulation protocol utilizes alternating current. In addition, the voltage is preferably sufficiently high so that a desired percentage of muscle fibers in the targeted muscles are recruited (contracted). In general, it is desirable for all of the muscle fibers to be recruited. It is expected that once all the muscle fibers are recruited, additional voltage causes heating of the muscle that can be detrimental to the carcass. In general, it is preferable to have the voltage between about 40V and about 500 V. In the case of alternating current, it is desirable to have a frequency of between about 40 Hz and about 60 Hz.

The electrical stimulation protocol preferably includes alternating periods of stimulation and rest. Preferably, the periods of stimulation are for between about one second and about five seconds, and more preferably between about 2 seconds and about 3 seconds. Preferably, the periods of rest are between about 0.5 seconds and about three seconds. A preferred electrical stimulation protocol can be conducted for sixty seconds including alternating periods of two seconds of electrical stimulation and one second of rest. In such an electrical stimulation protocol, it is believed that each of the electrical stimulation probes would provide a period of electrical stimulation and the period between each electrical stimulation probe would provide the period of rest. In addition, such an electrical stimulation protocol could be accomplished by arranging two of the electrical stimulation frames 412 in series to provide eighteen periods of electrical stimulation.

It is expected that each period of stimulation will be created by the contact of a single electrical stimulation probe with the surface of the animal carcass. Accordingly, the length of contact between the surface of the animal carcass and the electrical stimulation probe, at a particular animal carcass traveling speed, will result in a particular electrical stimulation contact time. It is expected that the contact length of the electrical stimulation probe (the length of the probe that contacts and provides electrical stimulation to the surface of the animal carcass) is between about one foot and about three feet, and more preferably between about 1½ feet and about 2½ feet.

When the animal carcass 410 being processed through the electrical stimulation frame 412 is a bovine carcass, it is generally preferably that the upper grounds 424 and 430 contact the carcass 410 in the general region of the fifth and sixth sacral vertebrae, and that the lower grounds 426 and 432 contact the carcass 410 in the general region of the fifth and sixth thoracic vertebrae. In addition, it is generally desirable for the plurality of electrical stimulation probes 428 and 434 to contact the carcass 410 in the general region between the eleventh thoracic vertebra and the second lumbar vertebra. By contacting the animal carcass 410 with the grounds and electrical stimulation probes at these locations, it is believed that the electrical stimulation can be targeted in the carcass midsection which generally includes the thinner muscles of the rib and loin which are generally characterized as extending from about between the fifth and sixth thoracic vertebrae and about between the fourth and fifth sacral vertebrae. It is generally desirable to minimize electrical current stimulation in the chuck and round muscles to allow the chuck and round muscles to cool to a desired temperature prior to the onset rigor mortis. Accordingly, the electrical stimulation apparatus according to the invention preferably focuses the electrical stimulation within the midsection.

It should be understood that the subject matter of U.S. Provisional Application Ser. No. 60/178,836, filed on Jan. 28, 2000, is incorporated herein by reference.

What is claimed:

1. A method for processing an animal carcass having a first section and a second section, the first section having a substantially lower muscle thickness than the second section, the method comprising:

focusing electric current to the first section to stimulate the muscle of the first section; and isolating the second section, using a ground, such that the electric current applied to the first section is inhibited from stimulating the muscle of the second section.

2. The method of claim 1 wherein the first section has a generally constant cross-sectional area extending longitudinally along the carcass.

3. The method of claim 1 wherein focusing the electric current includes applying electric current by contacting an exterior surface of the first section with a conductive bar.

4. The method of claim 3 wherein isolating the second section includes contacting an exterior surface of the second section with a conductive bar in electrical communication with a ground.

5. The method of claim 1 wherein the focusing electric current includes applying an electrical current having a voltage of between about 40 volts and about 100 volts.

6. The method of claim 5 wherein the electrical current is an alternating current having a frequency of between about 40 Hz and about 60 Hz.

7. The method of claim 1 further comprising subjecting the carcass to a cycle of stimulation including periods of stimulation interrupted by periods of rest.

8. The method of claim 1 wherein the animal carcass comprises a bovine carcass.

9. The method of claim 8 wherein the first section of the animal carcass includes a rib section and a loin section.

10. The method of claim 8 wherein the second section of the animal carcass includes a chuck section and a round section.

11. The method of claim 1 further comprising cooling the animal carcass so that an internal muscle temperature of the second section is less than about 70° F. before the onset of rigor mortis.

12. The method of claim 1 wherein the first section includes inner muscles provided from about between the fifth and sixth thoracic vertebrae and about between the fourth and fifth sacral vertebrae.

13. The method of claim 1 further comprising cooling the animal carcass so that an internal muscle temperature of the second section is less than about 40° F. within about 48 hours after slaughter.

14. A method of influencing the quality of the meat of a livestock carcass by performing the steps of:

focusing electric current to a thin meat section of the carcass to stimulate the muscles of the thin meat section; and isolating a thick meat section of the carcass so that minimal electric current is applied to the thick meat section;

whereby the application of electric current to the thin meat section causes the process of rigor mortis to occur faster in the thin meat section, and the isolation of the thick meat section allows the process of rigor mortis to occur at a normal pace.

15. The method of claim 14 further comprising cooling the animal carcass so that an internal muscle temperature of the dense meat section is less than about 40° F. within about 48 hours after slaughter.

16. The method of claim 14 wherein the thin meat section includes inner muscles provided from about between the fifth and sixth thoracic vertebrae and about between the fourth and fifth sacral vertebrae.

17. A method for improving the tenderness of meat from a livestock carcass comprising:

providing an animal carcass having a thin meat section and a thick meat section;

focusing electric current to the thin meat section by contacting with at least one stimulation bar; and isolating the thick meat section from the electric current by grounding a portion of the thick meat section adjacent to the thin meat section.

18. The method of claim 17 wherein the thin meat section includes inner muscles provided from about between the fifth and sixth thoracic vertebrae and about between the fourth and fifth sacral vertebrae.

19. The method of claim 17 further comprising cooling the animal carcass so that an internal muscle temperature of the thick meat section is less than about 70° F. before the onset of rigor mortis.

20. The method of claim 17 further comprising cooling the animal carcass so that an internal muscle temperature of the thick meat section is less than about 40° F. within about 48 hours after slaughter.

21. A method for improving the tenderness of meat from a livestock carcass comprising:

providing an animal carcass having midsection meat section, a posterior meat section, and an anterior meat section;

focusing electric current to the midsection meat section by contacting with at least one stimulation bar; and isolating the posterior meat section and anterior meat section from the electric current by grounding a portion of the posterior meat section adjacent to the midsection meat section and by grounding a portion of the anterior meat section adjacent to the midsection meat section.

22. The method of claim 21 wherein the posterior meat section is the round meat section of a bovine carcass.

23. The method of claim 21 wherein the anterior meat section is the chuck meat section of a bovine carcass.

24. The method of claim 21 wherein the midsection meat section is the rib and loin section of a bovine carcass.

25. The method of claim 21 wherein the midsection meat sections are the more valuable meat sections and wherein the midsection meat sections are the most tenderized.

* * * * *